(12) United States Patent
Bhatti

(10) Patent No.: US 8,040,005 B2
(45) Date of Patent: Oct. 18, 2011

(54) PLASTIC POLE HOUSING FOR AN ELECTRIC MOTOR

(75) Inventor: Irfan A. Bhatti, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 402 days.

(21) Appl. No.: 12/069,341

(22) Filed: Feb. 8, 2008

(65) Prior Publication Data

US 2009/0200881 A1    Aug. 13, 2009

(51) Int. Cl.
*H02K 5/02* (2006.01)
(52) U.S. Cl. .................. 310/154.09; 310/88; 310/89
(58) Field of Classification Search ............. 310/154.08, 310/9, 154.07, 89, 88, 154
See application file for complete search history.

(56) References Cited

U.S. PATENT DOCUMENTS

| | | | |
|---|---|---|---|
| 2,650,992 A | | 9/1953 | Forss et al. |
| 3,210,457 A | * | 10/1965 | Hancock et al. ............ 174/503 |
| 3,308,317 A | * | 3/1967 | Allenbaugh ................. 310/88 |
| 3,391,290 A | | 7/1968 | Hahndorf et al. |
| 3,422,295 A | * | 1/1969 | Parker ..................... 310/154.07 |
| 3,445,692 A | * | 5/1969 | Masao ..................... 310/71 |
| 3,527,969 A | | 9/1970 | Papst |
| 4,499,391 A | | 2/1985 | Sakamoto |
| 5,268,607 A | * | 12/1993 | McManus ................ 310/89 |
| 5,584,114 A | | 12/1996 | McManus |
| 5,723,924 A | | 3/1998 | Blanchet |
| 5,731,646 A | | 3/1998 | Heinze et al. |
| 6,163,094 A | | 12/2000 | Jansson |
| 6,191,516 B1 | | 2/2001 | Froehlich et al. |
| 6,215,215 B1 | | 4/2001 | Huber et al. |
| 6,359,363 B1 | | 3/2002 | Foerstera et al. |
| 6,713,913 B1 | | 3/2004 | Hager et al. |
| 6,717,299 B2 | | 4/2004 | Bacile et al. |
| 6,897,580 B2 | | 5/2005 | White |
| 6,906,438 B2 | | 6/2005 | Ursel et al. |
| 6,982,511 B2 | | 1/2006 | Onder et al. |
| 7,078,835 B2 | | 7/2006 | Gross et al. |
| 7,142,001 B2 | | 11/2006 | Bhatti |
| 2004/0032177 A1 | | 2/2004 | Nitzche et al. |
| 2004/0104636 A1 | | 6/2004 | Ortt et al. |
| 2004/0155528 A1 | * | 8/2004 | Ziegler et al. ................ 307/64 |
| 2005/0184608 A1 | * | 8/2005 | Williams et al. ............. 310/89 |
| 2006/0071567 A1 | * | 4/2006 | Acosta .................. 310/154.08 |
| 2006/0125330 A1 | | 6/2006 | Winkler et al. |
| 2007/0040454 A1 | * | 2/2007 | Freudenberger et al. ....... 310/12 |
| 2007/0052437 A1 | | 3/2007 | Bhatti |

FOREIGN PATENT DOCUMENTS

DE    1438379        10/1968
EP    0982483 A2    3/2000

* cited by examiner

*Primary Examiner* — Quyen Leung
*Assistant Examiner* — Naishadh Desai
(74) *Attorney, Agent, or Firm* — Baker & Daniels LLP

(57) ABSTRACT

A housing assembly for an electric motor includes a sealed plastic enclosure having a body portion having a nose and an open end opposite from the nose. The open end provides access to an interior region of the plastic enclosure. The housing assembly also includes a metal sleeve located within the interior region of the plastic enclosure, and a magnet structure located within an interior region of the metal sleeve.

31 Claims, 4 Drawing Sheets

PLASTIC POLE HOUSING FOR AN ELECTRIC MOTOR

FIELD OF THE INVENTION

The present invention relates generally to electric motors. More particularly, the present invention relates to an improved plastic pole housing for an electric motor.

BACKGROUND AND SUMMARY OF THE INVENTION

Electrical motors, such as actuator motors used in automotive applications, typically include a metal pole housing configured to receive magnets and an armature to form the electric motor. These metal pole housings are used to maintain a magnetic circuit of the electric motor in a closed field or loop manner. Therefore, the motor operates by having the armature turn inside the pole housing when a voltage is supplied to the motor. Metal pole housings are produced using a variety of different manufacturing processes. For example, the pole housings may be formed by a deep drawn stamping process, a rolling process, an extrusion process, or other forming process. The cost of an electric motor changes significantly depending upon the type of manufacturing process used for the metal pole housings.

Typically, a deep drawn stamping process is used to manufacture metal motor pole housings used in applications where water sealing is required. Deep drawn metal stamping processes are very specialized and sophisticated. Therefore, very few suppliers are able to meet an established stringent engineering requirement. As a result, product design and tooling costs are very high for such deep drawn metal stamping designs.

The costs of such metal pole housings are further increased if sintered bushings are required. These bushings are commonly used in electric motors to support the motor armature shaft. In addition, plastic end plugs or thrust buttons for the armature shafts may also be required with metal pole housings. Such plastic end plugs or thrust buttons locate a specific broach pocket for the shaft and reduce rubbing and thumping noises during operation of the motor by avoiding asperity contact between the metal shaft of the armature and the metal pole housing.

Rolled metal pole housings are often used for electric motors where water sealing is not a requirement. Since the rolling or forming process is a relatively simple process, design and tooling costs are much less than those associated with the deep drawn stamping processes. However, pole housings made using the rolling process are not water tight. Therefore, such rolled pole housings are typically used only for unsealed applications. Sintered bushings and/or armature shaft end plugs are also used with the rolled pole housings which further increase the costs of these housings.

In order to overcome some of the problems associated with metal pole housings, plastic pole housings for electric motors have recently been introduced. The present invention provides improvements to such plastic pole housings for electric motors. The present invention provides significant costs advantages especially compared to deep drawn metal stamping processes. The present invention also provides a plastic pole housing which meets water sealing requirements so that the plastic pole housing of the present invention may be used in applications where rolled metal pole housings typically cannot be used. The present invention also improves sound damping characteristics and reduces weight as compared to conventional metal pole housings.

In an illustrated embodiment of the present invention, a housing assembly for an electric motor comprises a sealed plastic enclosure including a body portion having a nose and an open end opposite from the nose. The open end provides access to an interior region of the plastic enclosure. The housing assembly also comprises a metal sleeve located within the interior region of the plastic enclosure, and a magnet structure located within an interior region of the metal sleeve.

In an illustrated embodiment, the plastic enclosure is formed from a material capable of operating at temperatures ranging from about −40° C. to about 85° C. Illustratively, the plastic enclosure is formed from a material capable of withstanding a thermal shock of at least 110° C.

In another illustrated embodiment of the present invention, a housing assembly for an electric motor comprises a plastic enclosure including a body portion having an outer surface and an inner surface defining an interior region. The body portion also has a nose and an open end opposite from the nose. The open end provides access to the interior region of the plastic enclosure. The housing assembly also comprises a plurality of crush ribs formed on the inner surface of the plastic enclosure, a metal sleeve located within the interior region of the plastic enclosure, and a magnet structure located within an interior region of the metal sleeve. The metal sleeve is configured to engage the plurality of crush ribs.

In an illustrated embodiment, the crush ribs include a lead-in ramp surface located adjacent the open end of the plastic enclosure and an elongated body portion extending longitudinally along the inner surface of the plastic enclosure. In one embodiment, the plastic enclosure is sealed to prevent water from entering the interior region of the plastic enclosure.

In yet another illustrated embodiment of the present invention, a housing assembly for an electric motor comprises a plastic enclosure including a body portion having a nose and an open end opposite from the nose. The open end provides access to an interior region of the plastic enclosure. The housing assembly also comprises a metal sleeve located within the interior region of the plastic enclosure, the metal sleeve being formed from separate first and second metal sheets, and a magnet structure located within an interior region of the metal sleeve.

In an illustrated embodiment, the first and second separate metal sheets include tabs configured to couple the first and second metal sheets together to form the metal sleeve. In one embodiment, the first and second metal sheets are identically shaped.

Additional features of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The above-mentioned and other features of this invention, and the manner of attaining them, will become more apparent and the invention itself will be better understood by reference to the following description of illustrated embodiments of the invention taken in conjunction with the accompanying drawings, wherein.

DETAILED DESCRIPTION OF THE DRAWINGS

Figure 1:
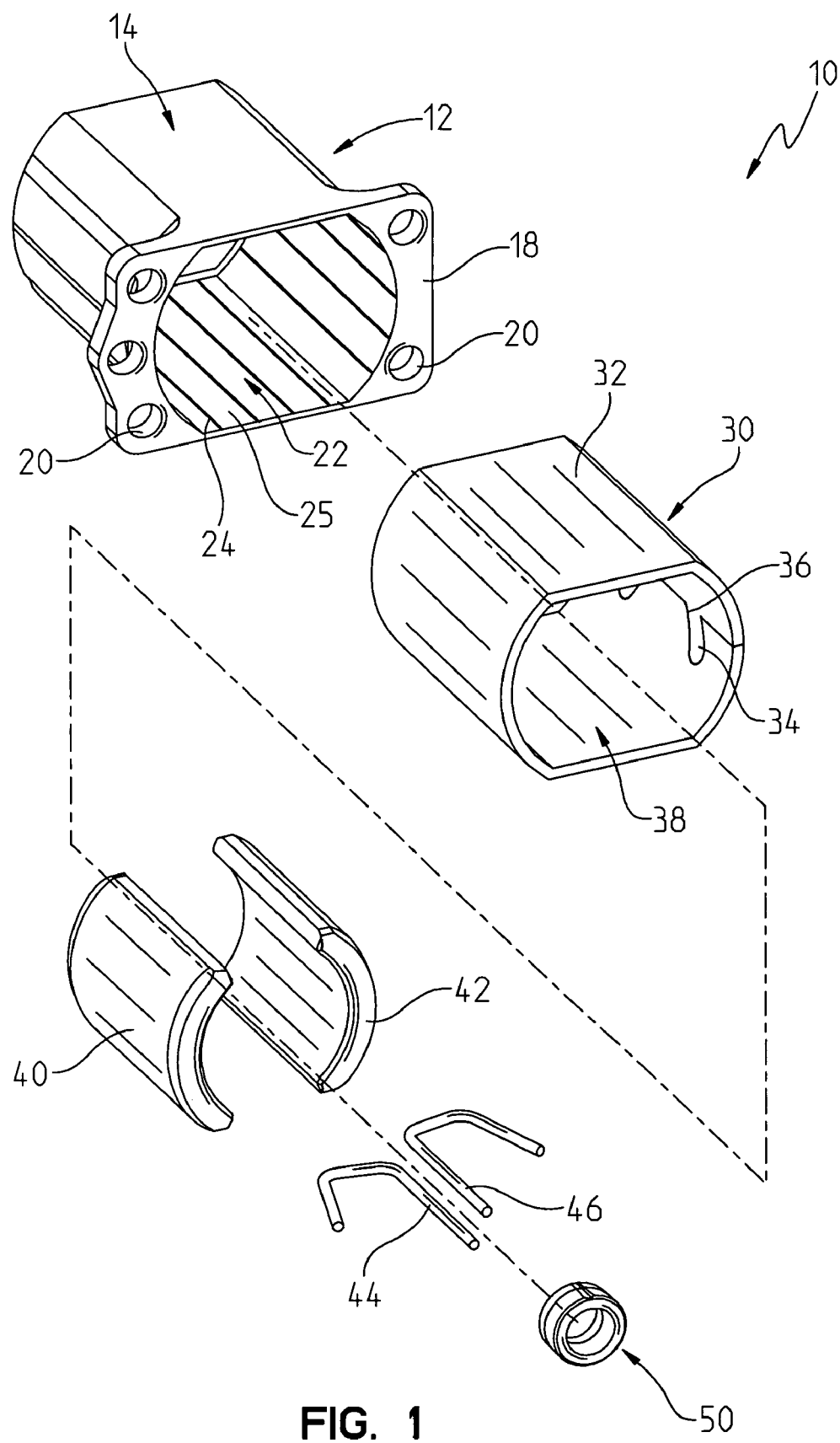
FIG. 1 is an exploded perspective view of a first embodiment of a plastic pole housing of the present invention configured to receive an armature to provide an electric motor.
Figure 2:
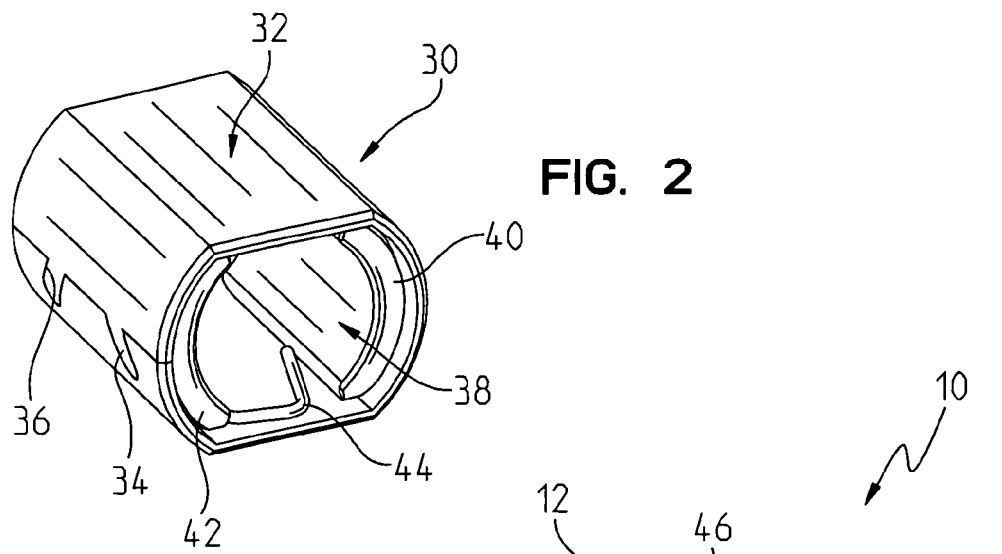
FIG. 2 is a perspective view of a metal sleeve of the embodiment of FIG. 1 illustrating first and second magnets and retainer springs located within the metal sleeve.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected" and "coupled" are used broadly and encompass both direct and indirect mounting, connecting, and coupling.

Referring now to the drawings, FIGS. 1-4 illustrate a first embodiment of a plastic pole housing 10 of the present invention. The plastic pole housing 10 includes a plastic enclosure 12 having a body portion 14, a nose 16, and an attachment flange 18. The attachment flange 18 includes a plurality of apertures 20 configured to receive fasteners to couple the plastic pole housing 10 to a support structure (not shown) such as, for example, a gear box within a vehicle or other location. A conventional connector or brush card assembly (not shown) is coupled to the open end of the plastic enclosure 12 adjacent flange 18. A suitable seal such as a rubber gasket over molded onto an interface portion of the brush card is provided to seal an interior region 22 of the plastic enclosure 12. The brush card assembly also includes an electrical connector which interfaces with a wire harness that provides power, ground and other control connections to the electric motor.

The first embodiment of the present invention shown in FIGS. 1-4 includes a metal sleeve 30 configured to be positioned within the interior region 22 of plastic enclosure 12. In this embodiment, metal sleeve 30 is formed from a single sheet 32 of metal which is rolled or otherwise shaped to the configuration of FIGS. 1 and 2 and then locked together by tabs inserting 34 at one end of the metal sheet 32 into slots 36 at the opposite end of sheet 32. Illustratively, sheet 32 may be a rolled steel material. A pair of permanent magnets 40 and 42 are located within an interior region 38 of metal sleeve 30. Magnets 40 and 42 are held in position by first and second spring clips 44 and 46.

Figure 3:
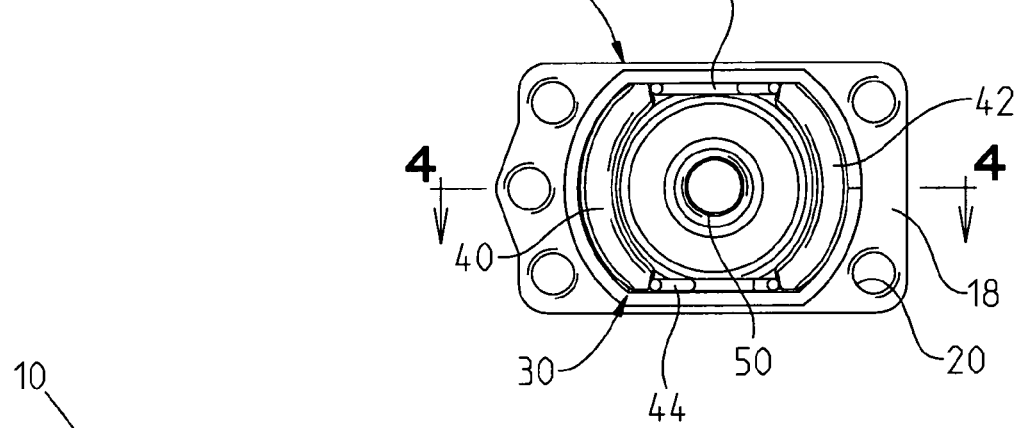
FIG. 3 is an end view of the assembled plastic pole housing of FIG. 1.
Figure 4:
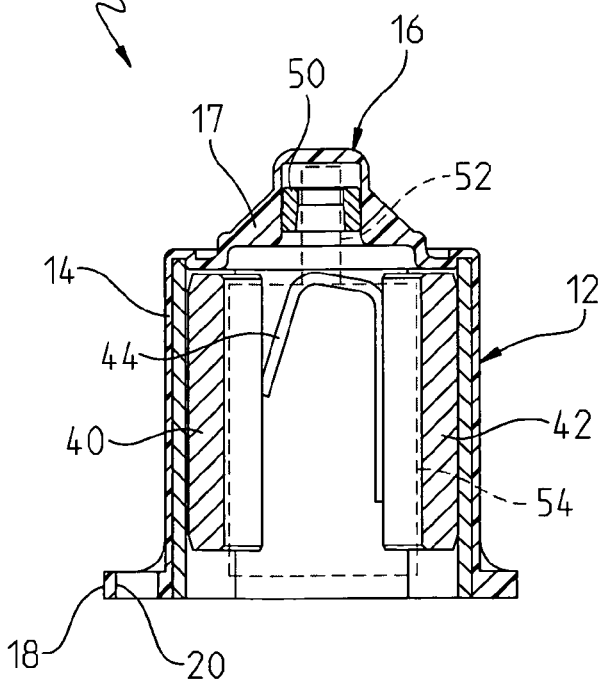
FIG. 4 is a sectional view taken along lines 4-4 of FIG. 3 illustrating further details of the plastic pole housing.

FIG. 3 illustrates the metal sleeve 30, magnets 40 and 42, and spring clips 44 and 46 located in the interior region 22 of the plastic enclosure 12 to form the plastic pole housing 10. In the illustrated embodiment of FIGS. 1-4, a bushing or bearing 50 is press-fit into a pocket formed by nose 16 of plastic enclosure 12 to support a shaft 52 of an armature 54. Shaft 52 is shown diagrammatically in FIG. 4. In other embodiments, the bushing or bearing 50 may be omitted so that the armature shaft 52 directly engages the plastic pocket formed by nose 16 of plastic enclosure 12. Bushing 50 is illustratively made from a plastic material such as Teflon® material or Delrin® material available from Dupont. A sintered bearing 50 may also be used, if desired.

In an illustrated embodiment, the plastic enclosure 12 is sealed without any vent openings for heat dissipation. Therefore plastic enclosure 12 is suitable for use in applications where water sealing is required. If water sealing is not required, openings can be added to the plastic enclosure 12 to reduce weight.

Illustratively, plastic enclosure 12 is made from a suitable plastic material to withstand heat generated by the armature 54 of the electric motor which also heats the metal sleeve 30. Illustratively, the plastic enclosure 12 is made from a suitably molded plastic material capable of operating ranges from about −40° C. to about 85° C. Rapid temperature changes from extreme cold to hot environments typically thermally shocks or stresses a product. Such thermal shock may cause permanent changes in electrical performances and can cause product failure. In the illustrated embodiment, the plastic enclosure 12 is able to withstand a thermal shock of about 100° C. to about 125° C. Preferably, plastic enclosure 12 is able to withstand a thermal shock of at least 110° C.

The present invention provides a low cost replacement for deep drawn metal stamping pole housings without any major changes in the production line assembly process. In other words, the plastic enclosure 12 may be formed to fit where a similarly shaped deep drawn metal or rolled metal pole housings are placed in a vehicle or other location. The present invention improves sound damping characteristics by providing the sealed plastic enclosure 12 and by reducing metal-to-metal contact. The present invention also reduces weight compared to metal pole housings. In addition, the plastic enclosure 12 permits the use of an armature shaft 54 without a plastic end plug or thrust button in certain embodiments. Therefore, the plastic pole housing 10 of the present invention reduces costs and weight while meeting water seal requirements and maintaining production line assembly processes.

Figure 5:
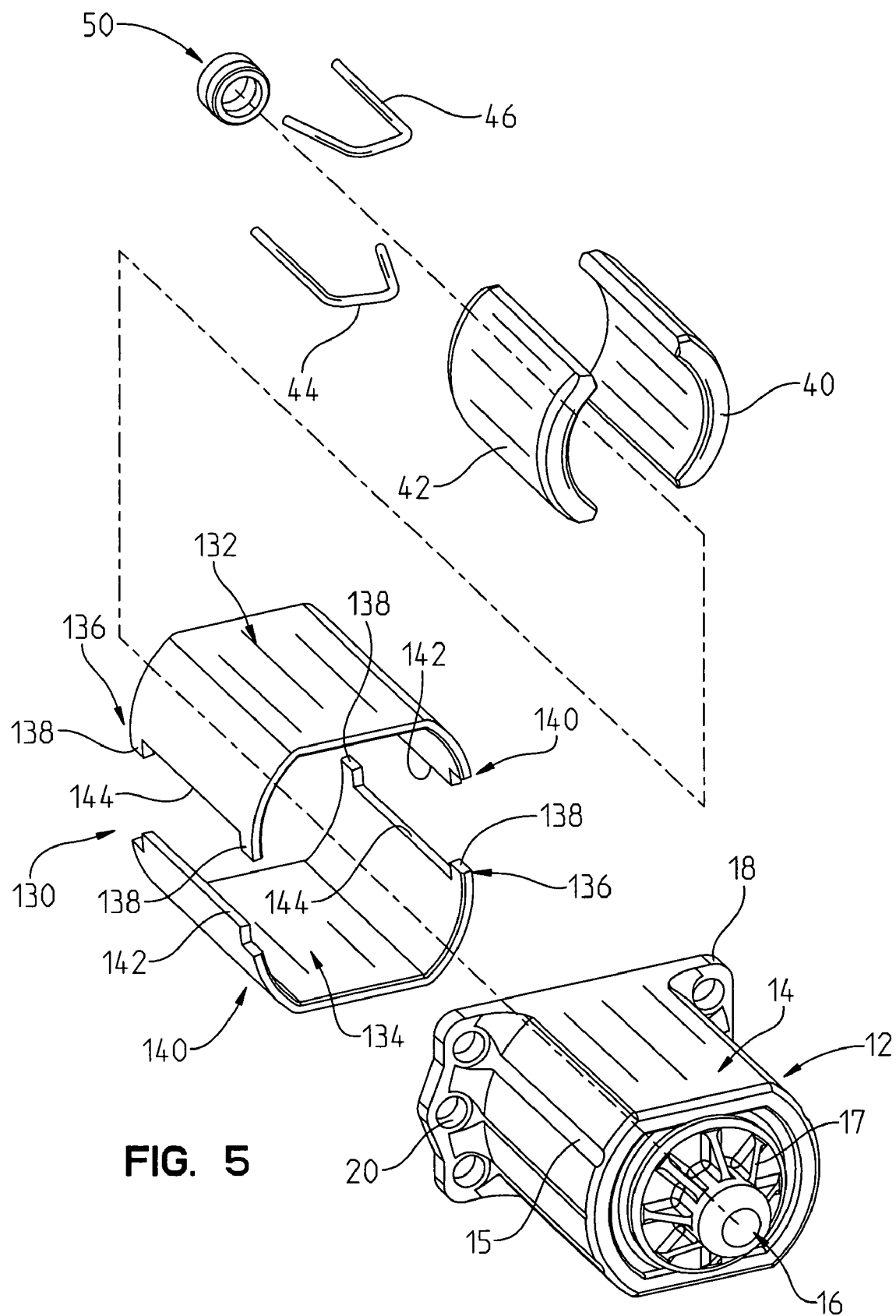
FIG. 5 is an exploded perspective view of another embodiment of a plastic pole housing of the present invention which includes a two piece metal sleeve.
Figure 6:
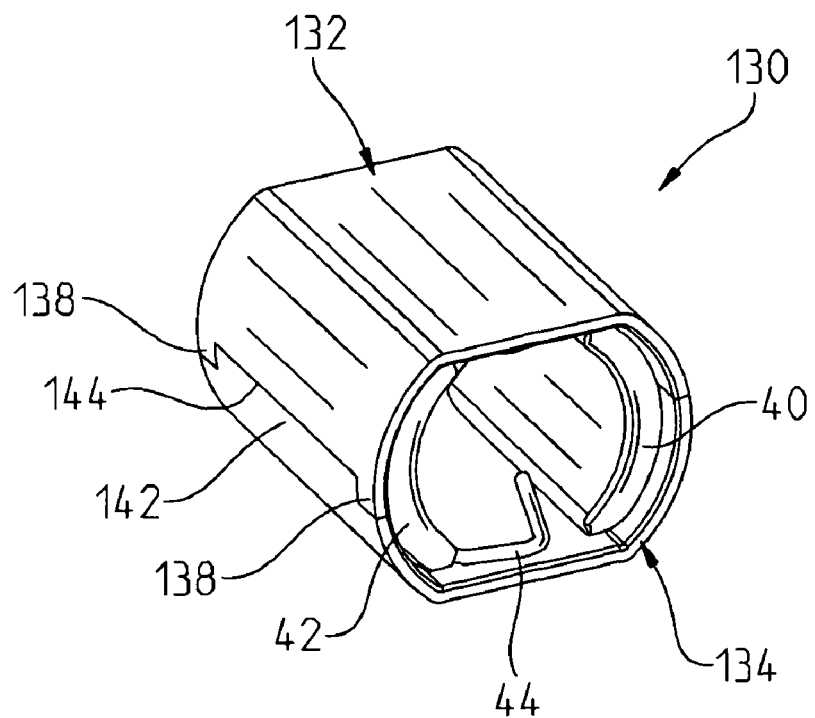
FIG. 6 is a perspective view of the metal sleeve of FIG. 5 with the first and second magnets and spring clips located therein.

Another embodiment of the present invention is illustrated in FIGS. 5 and 6. FIG. 5 illustrates further details of the plastic enclosure 12 which is the same enclosure 12 as in the embodiment of FIGS. 1-4. As shown in FIG. 5, the plastic enclosure 12 includes recessed portions 15 extending longitudinally along body portion 14. In addition, nose 16 illustratively includes a plurality of strengthening ribs 17.

In the embodiment of FIGS. 5 and 6, the metal sleeve 130 is illustratively formed from two separate metal sheets 132 and 134. Formed metal sheets 132 and 134 are illustratively identically shaped components which facilitates manufacturing and inventory. However, the separate sheets are not required to be identical. Sheets 132 and 134 may be formed from a rolled steel material, for example.

Each of the metal sheets 132 and 134 includes a first end 136 having outer tabs 138 and a second end 140 having an inner tab 142. As best shown in FIG. 6, the inner tabs 142 fit within a recess 144 formed between outer tabs 138 to provide the metal sleeve 130 when sheets 132 and 134 are assembled as shown in FIG. 6. It is understood that other tab configurations may be used on sheets 132 and 134.

Components in FIG. 5 having the same numbers as FIGS. 1-4 are identical to the components of FIGS. 1-4 discussed above. After the metal sheets 132 and 134 are placed together to form the metal sleeve 130, the metal sleeve 130, magnets 40 and 42, and spring clips 44 and 46 are installed into the interior region 22 of plastic enclosure 12 as discussed above.

FIG. 6 illustrates the magnets 40 and 42 and spring clips 44 and 46 located within the metal sleeve 130.

Figure 7:
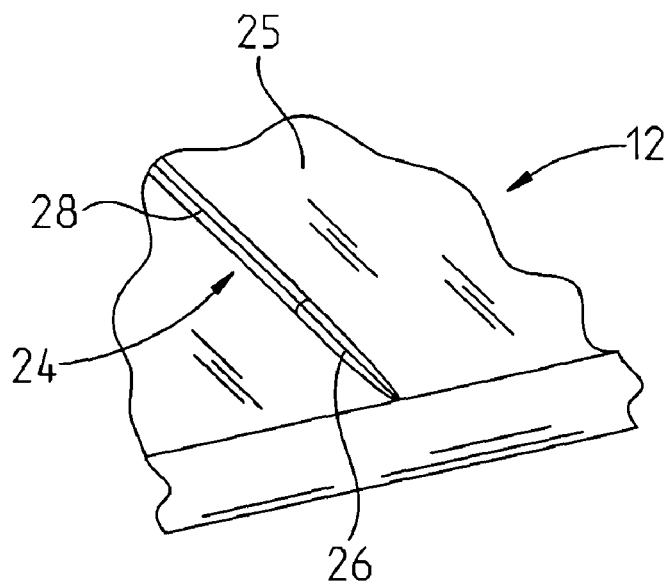
FIG. 7 is an enlarged perspective view of a portion of FIG. 1 further illustrating one of the crush ribs formed on an inner surface of the plastic enclosure.

In an illustrated embodiment, the plastic enclosure 12 includes a plurality of spaced apart crush ribs 24 formed on the inner surface 25 of plastic enclosure 12. Crush ribs 24 extend longitudinally on the inner surface 25 defining the interior region 22 of plastic enclosure 12 as best shown in FIG. 1. Crush ribs 24 include a lead-in ramp surface 26 located adjacent the open end of plastic enclosure 12. Crush ribs 24 also include a main body portion 28 located adjacent the lead-in ramp portion 26 as best shown in FIG. 7. The size and number of crush ribs 24 within the plastic enclosure 12 may be varied depending upon the particular application and the materials used to form plastic enclosure 12 and metal sleeves 30, 130.

The crush ribs 24 improve alignment between the components within the plastic enclosure 12. The crush ribs 24 compensate for any slight production variations of the components. For instance, during the installation process, certain of the crush ribs 24 on the inner surface 25 of plastic housing 12 may be crushed or displaced more than other crush ribs 24 due to irregularities of the plastic enclosure 12 or the metal sleeves 30, 130. Without the crush ribs 24, such irregularities may cause misalignment of the components of the plastic pole housing 10 or provide unnecessary pressure on different components of the pole housing 10.

In illustrated embodiments, 10-24 crush ribs 24 may be spaced apart on inner surface 25 of plastic housing 12. In one illustrated example, the body portion 28 of each crush rib 24 has a height of about 0.25 mm and a width of about 0.25 mm. However, as discussed above, it is understood that the dimensions of crush ribs 24 and the number of crush ribs 24 can be varied depending upon the particular application and the materials used within the pole housing 10.

While the invention has been illustrated and described in detail in the drawings and foregoing description, the description is to be considered as illustrative and not restrictive in character. Variations and modifications exist within the scope and spirit of the present invention as described and defined herein and in the following claims.

What is claimed is:

1. A housing assembly for an electric motor, the housing assembly comprising:
   a sealed plastic enclosure including a body portion having a nose and an open end opposite from the nose, the open end providing access to an interior region of the plastic enclosure;
   a metal sleeve located within the interior region of the plastic enclosure; and
   a magnet structure located within an interior region of the metal sleeve.

2. The housing assembly of claim 1, wherein the metal sleeve is formed from a single sheet of metal material having tabs at a first end cooperating with slots at a second end to form the metal sleeve.

3. The housing assembly of claim 1, wherein the metal sleeve is formed from first and second separate metal sheets.

4. The housing assembly of claim 3, wherein the first and second separate metal sheets include tabs configured to couple the first and second metal sheets together to form the metal sleeve.

5. The housing assembly of claim 3, wherein the first and second metal sheets are identically shaped.

6. The housing assembly of claim 1, wherein the magnet structure includes first and second permanent magnets located within the interior region of the metal sleeve.

7. The housing assembly of claim 6, further comprising at least one spring clip located within the interior region of the metal sleeve to hold the first and second permanent magnets within the metal sleeve.

8. The housing assembly of claim 1, further comprising a bearing located in the nose of the plastic enclosure, the bearing being configured to receive a shaft of an armature of the electric motor.

9. The housing assembly of claim 1, further comprising a plurality of crush ribs formed on an inner surface of the plastic enclosure.

10. The housing assembly of claim 9, wherein the crush ribs include a lead-in ramp surface adjacent the open end of the plastic enclosure and an elongated body portion extending longitudinally along the inner surface of the plastic enclosure.

11. The housing assembly of claim 1, wherein the plastic enclosure is formed from a material capable of operating at temperatures ranging from about −40° C. to about 85° C.

12. The housing assembly of claim 1, wherein the plastic enclosure is formed from a material capable of withstanding a thermal shock of at least 110° C.

13. A housing assembly for an electric motor, the housing assembly comprising:
   a plastic enclosure including a body portion having an outer surface and an inner surface defining an interior region, the body portion also having a nose and an open end opposite from the nose, the open end providing access to the interior region of the plastic enclosure;
   a plurality of crush ribs formed on the inner surface of the plastic enclosure, the crush ribs including an elongated body portion extending longitudinally along the inner surface of the plastic enclosure and a lead-in ramp surface located adjacent the open end of the plastic enclosure, the lead-in ramp surface extending from the inner surface of the plastic enclosure to a height of the elongated body portion;
   a metal sleeve located within the interior region of the plastic enclosure, the metal sleeve being configured to engage the plurality of crush ribs; and
   a magnet structure located within an interior region of the metal sleeve.

14. The housing assembly of claim 13, wherein the plastic enclosure is sealed to prevent water from entering the interior region of the plastic enclosure.

15. The housing assembly of claim 13, wherein the metal sleeve is formed from separate first and second metal sheets.

16. The housing assembly of claim 13, wherein the plastic enclosure is formed from a material capable of withstanding a thermal shock of at least 110° C.

17. A housing assembly for an electric motor, the housing assembly comprising:
   a plastic enclosure including a body portion having a nose and an open end opposite from the nose, the open end providing access to an interior region of the plastic enclosure;
   a metal sleeve located within the interior region of the plastic enclosure, the metal sleeve being formed from separate first and second identically shaped metal sheets; and
   a magnet structure located within an interior region of the metal sleeve.

18. The housing assembly of claim 17, wherein the plastic enclosure is sealed to prevent water from entering the interior region of the plastic enclosure.

19. The housing assembly of claim 17, wherein the body portion of the plastic enclosure includes an outer surface and an inner surface defining the interior region of the plastic enclosure, and further comprising a plurality of crush ribs formed on the inner surface of the plastic enclosure.

20. The housing assembly of claim 1, wherein the nose of the body portion of the sealed plastic enclosure is configured to support a shaft of an armature therein, the metal sleeve surrounding the armature.

21. The housing assembly of claim 20, further comprising one of a bushing and a bearing press-fit into a pocket formed by the nose of the body portion of the sealed plastic enclosure to support the shaft of the armature.

22. The housing assembly of claim 20, wherein the shaft of the armature directly engages a pocket formed by the nose of the body portion of the sealed plastic enclosure.

23. The housing assembly of claim 13, wherein the body portion of the plastic enclosure has a cylindrical shape and the plurality of crush ribs are spaced apart around the inner surface so crush ribs are located on opposing portions of the inner surface to engage opposite sides of the metal sleeve.

24. The housing assembly of claim 23, wherein certain of the crush ribs on the inner surface are displaced more than other crush ribs during insertion of the metal sleeve into the interior region of the plastic enclosure due to irregularities of at least one of the plastic enclosure and the metal sleeve.

25. The housing assembly of claim 23, wherein at least 10 crush ribs are spaced apart on the inner surface of the body portion of the plastic enclosure.

26. The housing assembly of claim 23, wherein at least 20 crush ribs are spaced apart on the inner surface of the body portion of the plastic enclosure.

27. The housing assembly of claim 23, wherein the height of the body portion of the crush ribs is about 0.25 mm.

28. The housing assembly of claim 27, wherein a width of the body portion of the crush ribs is about 0.25 mm.

29. The housing assembly of claim 17, wherein the first and second metal sheets each include a first end having a first connecting portion a second end having a second connecting portion shaped differently than and complementary to the first connecting portion.

30. The housing assembly of claim 29, wherein the first connecting portions include a pair of outer tabs defining a recess adjacent the first end of the first and second sheets and the second connecting portions include an inner tab formed adjacent the second end of the first and second sheets, the inner tabs being configured to fit within the recess to provide the metal sleeve when the first and second metal sheets are assembled together.

31. The housing assembly of claim 29, wherein the first and second ends of the first and second metal sheets abut the second and first ends, respectively, of the other of the first and second metal sheets to provide a continuous metal sleeve without gaps between the first and second metal sheets.

* * * * *